June 3, 1969     S. TUDOR ETAL     3,447,969

STORAGE BATTERY IMPROVEMENT

Filed Nov. 17, 1966

INVENTORS.
SIDNEY TUDOR
AARON WEISSTUCH
SAMUEL H. DAVANG

BY Arthur L. Bowers
AGENT

Lou B. Appleton
ATTORNEY

United States Patent Office 3,447,969
Patented June 3, 1969

3,447,969
STORAGE BATTERY IMPROVEMENT
Sidney Tudor, Forest Hills, Aaron Weisstuch, Flushing, and Samuel H. Davang, Brooklyn, N.Y., assignors to the United States of America as represented by the Secretary of the Navy
Filed Nov. 17, 1966, Ser. No. 595,273
Int. Cl. H01m *39/04, 35/08*
U.S. Cl. 136—26                                      2 Claims

ABSTRACT OF THE DISCLOSURE

Improvements in pasted or sintered plates of storage batteries, particularly the pasted-grid positive plates of a lead-acid battery wherein the paste or active material closer to the grid is of higher density than the paste further from the grid, the active material being applied in two or more layers and wherein the layers are not necessarily continuous over the grid or over the preceding layer. Additionally, in lead acid batteries, phosphoric acid is included in the acid in a comparatively minor amount and in one layer of the paste.

---

The invention described herein may be manufactured and used by or for the Government of the United States of America for governmental purposes without the paymen of any royalities thereon or therefor.

This invention relates to improvements in storage batteries, particularly lead-acid storage batteries by lengthening useful life, minimizing maintenance requirements, improving capability of meeting emergencies by raising maximum current delivering capability over the life of the battery, increasing the ampere-hour delivering capacity between charges, and increasing the rate of charging capability. The useful life of a storage battery terminates when one of the stated properties decreases below an acceptable level.

Aspects of this invention are applicable to various types of storage batteries including lead-acid batteries and alkaline electrolyte batteries, such as nickel-cadmium, silver-cadmium, silver-zinc wherein the positive plates are sintered or pasted.

Generally battery plates include a grid. The functions of the grid are to serve as a framework for supporting porous active material whether the active material is pasted or sintered and also to serve as a low-resistance electrical path between the plate terminal lug and distributed areas of the active material. The porous character of the active material exposes more surface to the electrolyte. Though battery plates generally include grids, an example of a battery plate that does not have a grid is disclosed in U.S. Patent 3,053,925.

This invention relates particularly to lead-acid storage batteries. An indication of the state of the art of pasted lead plates for lead-acid batteries is provided by U.S. Patents 2,908,740 and 2,938,063.

Significant parameters of battery plates include the composition and density of the active material and the thickness of the battery plate. If all other things were equal, an increase in the amount of surface of a given amount of active material exposed to the electrolyte would appear to increase the maximum battery current both on charge and discharge. This would suggest very low density active material and assuming a given quantity of material, this would also suggest very thin plates but many of them. However, density must be at least sufficient for cohesiveness. At minimum density, shedding and crumbling occurs in too short a time to be practical. As density is increased useful life is increased to a practical level; normal density in the art evolved from a compromise between electrical, chemical, and mechanical characteristics. The lower limit of plate thickness is dicated not only by mechanical considerations and rate of shedding of active material but also by the characteristic of premature polarization, which in a lead-acid cell has been attributed to the early formation of a lead sulfate barrier layer adjacent to the positive grids. This layer, after a time, is irreversible, being present even when the battery is in charged condition. Lead sulfate is a poor electrical conductor and interferes with discharge. Assuming the same quantity of active material per cell, if the plates are made thicker, more time elapses before shedding becomes a significant problem, and more time elapses before polarization results in battery failure; however, thick plate batteries have the disadvantage of not affording the high discharge-rate capability that may be required during an emergency. Comparatively recent efforts to improve batteries by providing them with high density, relatively thin positive plates have demonstrated severely limited maximum discharge rate. Their weight-to-energy output ratio proved to be higher and their cost was greater because of the increased weight of active material. The positive plates of a lead-acid battery are a pasted lead grid structure. The wet paste used in pasting the plate conventionally includes a mixture of metallic lead, lead oxides and various additives, water and sulfuric acid. Mixtures vary from manufacturer to manufacturers and each manufacturer apparently adjusts the mixture for the battery function. Precise mixture details do not constitute part of this invention. The mixture forms a plastic paste. Pasting refers to applying the paste to the grid structure and is analogous to plastering wherein plaster is applied to an expanded metal lath. After the paste is pressed into and onto the grid the combination is dried. The dried paste forms a hard, cohesive, cemented material which is retained by the grid. The specific ingredients of the mixture, particle size, and the ratio of ingredients influences paste stiffness when mixed and density, hardness, and mechanical strength when dried, and the electrical properties of the resultant battery.

Lead-acid batteries with lead-antimony grids are most common. Lead-acid batteries with lead-calcium grids are more expensive than those employing lead-antimony grids but have displaced the latter in some applications. The lead-calcium alloy employed in lead-calcium grids includes approximately 0.05% calcium. Storage batteries with lead-antimony positive grids generate toxic gases, namely stibine and arsine, when charged, and therefore are unacceptable for use in a contained environment that is occupied by any person; lead-calcium grids do not produce toxic gases. Batteries with lead-calcium grids require less maintenance attention than those having lead-antimony grids, i.e., they do not require near as much attention to maintain proper electrolyte level and concentration. Lead-calcium grids contributed to the practicality of sealed batteries. Submarine applications and telephone system applications are major examples where batteries having lead-calcium grids are advantageous. Situations that call for lead-calcium batteries have particular need for the storage battery improvements recited previously.

An object of this invention is to improve storage batteries by increasing useful life, by increasing maximum current delivering capability over a longer term than heretofore, by improving charging rate capability, by improving ampere-hour capacity between charges, and by increasing the length of time over which the battery can deliver more than a prescribed minimum current.

A further object is to improve positive battery plates generally and lead-calcium grid battery plates in particular.

A further object is to provide a sealed storage battery having minimal water consumption, minimal self-discharge, high power density per unit weight and per unit volume relative to that achieved heretofore in comparable batteries, and high charging efficiency.

Other objects and advantages will appear from the following description of an example of the invention, and the novel features will be particularly pointed out in the appended claims.

In the drawings.

Similar numerals refer to similar parts throughout the several views.

Figure 1:
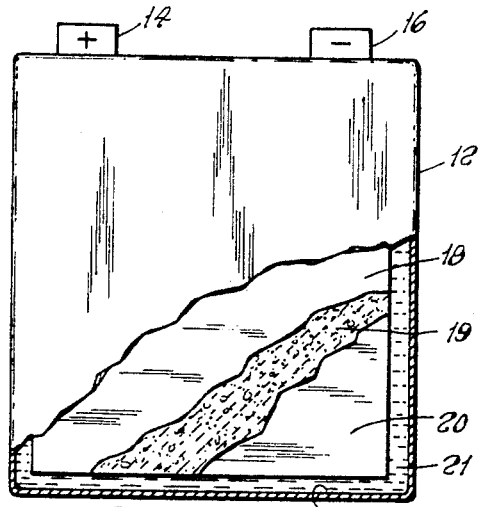
FIG. 1 is a plan view of a sealed storage battery with a portion broken away.

There is shown a sealed lead-acid storage battery 12 in FIG. 1 having a housing 13, positive and negative terminals 14 and 16 respectively and a plurality of positive plates 18 connected in common to positive terminal 14 and a plurality of negative plates 20 connected to negative terminal 16 and porous separators 19 between positive and negative plates, immersed in sulfuric acid electrolyte 21. Structural details of storage batteries are well known in the art as exemplified by the showing in U.S. Patent 3,172,782, and do not constitute part of this invention. The negative plates in the disclosure are of conventional construction and materials. The positive plates are constructed in accordance with this invention and the electrolyte is modified as described hereinafter.

Figure 2:
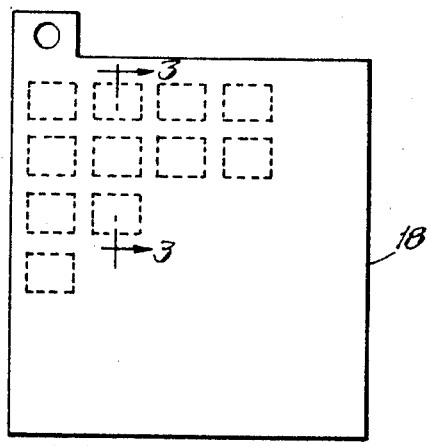
FIG. 2 is a plan view of a pasted battery plate indicating a sampling of conventional grid openings.
Figure 3:
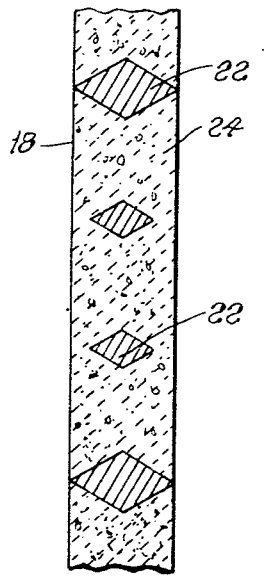
FIG. 3 is a section taken on line 3—3 of FIG. 2, and FIGS. 4, 5 and 5a are sections similar to that of FIG. 3 illustrating plural layer positive active paste on the grid.

There is shown in FIG. 2 a positive plate for the storage battery shown in FIG. 1 and includes a grid structure of pure lead or one of various lead alloys employed in lead-acid batteries. Lead-calcium alloy containing on the order of 0.05% calcium is superior for the positive grids of a sealed battery because of comparatively low water consumption that characterizes batteries with lead-calcium grids. FIGS. 3, 4, 5, and 5a show a sampling of geometric configurations for transverse portions of grids conventional in the battery art. In FIG. 3 the grid 22 is embedded in normal density paste mixture 24. Thin plate lead-calcium grid batteries containing normal density positive pastes have exhibited premature, severe, ampere-hour capacity reduction. Phosphoric acid additive in the electrolyte was tried and it was found that the additive in sufficient quantity prevents the formation of a lead sulfate barrier layer but the amount of phosphoric acid required to achieve this introduces the disadvantages of reducing initial ampere-hour capacity plus temporarily depressing ampere-hour capacity to a significant degree during the early cycles of charge-discharge followed by incomplete recovery during subsequent cycling.

Figure 4:
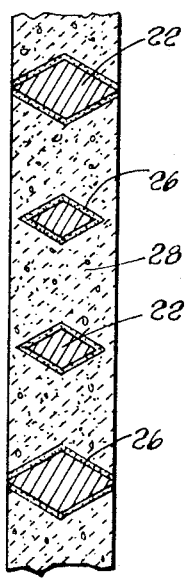

This invention concerns the use of plural layer positive active material as shown in FIG. 4, wherein an inner layer 26 is in face-to-face contact with and completely envelops or discontinuously or partially envelops the grid surface area and an outer exposed layer 28 generally envelops the inner layer. The inner and outer layers are of relatively greater and lesser density respectively. The inner layer is as thin as practical and preferably thinner than the outer layer though the invention does not exclude having an outer layer that is thinner than the inner layer. The wet paste for the inner more dense layer is on the order of 65 to 90 grams per cubic inch and the wet paste for the outer less dense paste is on the order of 50 to 80 grams per cubic inch. The entire range of paste densities approximately 50–90 grams per cubic inch, is in the state of the art. The wet positive paste is prepared by mixing finely divided oxides of lead, metallic lead powder, water, and a sulfuric acid in varying proportions. A wet paste mixture with a higher concentration of lead and lead oxides or with lead and lead oxides of smaller particle size has a higher density. The thin inner layer is applied to one side of the grid structure by screw-forced extrusion of the paste over the grid followed by vibration of the pasted grid and removal of excess or is applied with an application tool and pressed or rolled or forced by elevated or lowered pneumatic pressures into the grid structure, and then is similarly applied to the other side of the grid structure to substantially coat the surface area of the grid structure. Then one or more layers of lower density paste are applied over the inner layer of higher density paste. The plurality of layers may be applied at essentially the same time or processing steps may follow application of each layer. All layers may be dried at the same time or each layer may be dried separately or the pasted plate may be placed in the electrolyte without having been dried. Three or more layers of different density active material is within the contemplated scope of the invention.

An alternate method of preparation of the multiple layer positive active material structure consists of applying a thin layer of finely divided lead oxides or a mixture of lead oxides and metallic lead to the grid and then pasting in the conventional manner with the wet positive paste mix. Reaction with sulfuric acid and water from the wet paste or from the electrolyte in subsequent forming or cycling will produce a thin, high density layer at the grid surface. Finely divided lead oxides and metallic lead can be applied to the grids by various methods including for example: (1) electrostatic spray, (2) spray, dip, or dip with electrophoresis from a dispersion or suspension of the powder in a relatively inert, low boiling solvent such as water or acetone followed by drying to remove the solvent. An inert gas atmosphere, such as nitrogen, may be desirable to prevent oxidation of metallic lead powder during spraying and drying, and (3) sprinkling the lead oxide and metallic lead powder on the grid surface or on the extruded wet paste surface onto which the grid is pressed for pasting each side of the plate.

A storage battery as in FIG. 1 containing lead-calcium grid positive plates as in FIG. 4 has a satisfactory ampere-hour capacity for a substantially longer term, and high discharge rate capability for a longer term. These advantages are achieved without the disadvantages of phosphoric acid additive.

The lower density outer layer of positive active material with its relatively greater porosity contributes the high discharge rate capability and the bulk of the ampere-hour capacity. It was observed from autoradiographic studies that during successive charge-discharge cycles, a band of irreversible lead sulfate develops at the surface of the outer layer and progresses inwardly toward the inner layer. The higher-density inner-layer positive active material, by virtue of its low porosity, inhibits sulfate penetration thereby preventing formation of an irreversible lead sulfate barrier layer at and adjacent to the surface of the grid. The period of good electrical conductivity between grid and active material is greatly extended by this invention.

Shedding of positive paste material is greatly reduced by the addition of an amount of phosphoric acid to the sulfuric acid electrolyte on the order of 0.05 to 2 percent by volume of 85 percent of the phosphoric acid, depending on paste density and structure. This quantity of phosphoric acid is much less than that amount needed to resist the detrimental grid sulfation. This amount of phosphoric acid additive also is sufficient to counteract the effects of overchange and gassing and generally extends service life.

A large number of three-plate miniature cells were constructed for test purposes each containing one positive and two negative plates, fiberglass matting and ribbed microporous separators all housed in a polystyrene case. Positive grids were of lead-calcium alloy containing about 0.05% calcium measuring about 1.9 inches high by 1.4 inches wide, and about 0.093 inch thick. Negative grids were of pure lead and of the same size. Fully charged cells contained 45 milliliters of sulfuric acid of approximately 1.260 specific gravity at 25° C. After formation and 3–4 deep cycles of charge and discharge, each cell was operated on charge for 23 hours at 2.25 volts per cell and on discharge for one hour at about that current corresponding to discharge in six hours, and every two weeks, capacity discharge, i.e., discharge to about 1.75 volts, at the same discharge rate. Various test cells included 0.0, 0.2, 0.4, 0.8, 1.2 milliliters, respectively, of 85% concentration phosphoric acid. Sulfur-35 as $H_2S^{35}O_4$ and/or phosphorus-32 as $H_3P^{32}O_4$ were included in a number of cells for autoradiographic study.

Test cells without phosphoric acid exhibited relatively high initial ampere-hour capacity in approximately the first two weeks of cycling but most of this relatively high capacity was lost in various lengths of time after that; in every instance the duration of time of relatively high capacity was too short. Autoradiographs and electrochemical measurements proved that the capacity was limited by change in the positive plate. A high electrical resistance lead sulfate layer formed between the grid and paste material of the positive plate causing premature polarization. Also considerable sheeding of positive paste material was observed. This apparently also contributed to capacity loss.

The cells containing phosphoric acid exhibited temporary capacity decline during the first several cycles of charge-discharge, followed by substantial recovery of the capacity and very gradual decline over a greatly extended useful life compared to the useful life of those cells that did not contain phosphoric acid. The extent of early cycle capacity depression was proportional to the phosphoric acid concentration within the concentration limits investigated. There was markedly less shedding of positive active material compared to shedding in those cells having no phosphoric acid.

Test cells with the 0.2 milliliter and the 0.4 milliliter respectively of phosphoric acid exhibited longer lives than cells without phosphoric acid. After cycling for about a year and a half capacities were about 50% of initial values whereas test cells without phosphoric acid after having been cycled for about a half year exhibited on the order of 15–20% of initial capacity. Autoradiographs of positive plates from test cells containing 0.2 milliliter of phosphoric acid showed that phosphoric acid concentration in this range does not prevent positive grid sulfation sufficiently. Concentrations in the range of 0.2–0.4 milliliter prevented capacity losses in excess of 50% of initial capacity for about a year and a half. Of all the concentrations investigated, test cells with 0.4 milliliter phosphoric acid gave the best long term performance including the least shedding. After relatively large early-cycle capacity depression in test cells including 0.4 milliter phosphoric acid compared to capacity depression in test cells including lower phosphoric acid concentrations, the ampere-hour capacity recovered to about 80–90% of the initial ampere-hour capacity. Optimum phosphoric acid concentration varies slightly around that described over the range of positive paste density and structure and over the range of ratio of electrolyte volume to ampere hour capacity. In the tests described there was an excess of electrolyte.

Concentrations of phosphoric acid additive higher than the optimum reduces shedding further but this solutary effect is more than offset by deterioration in desirable electrical characteristics.

On the basis of a number of experiments it was established that temporary capacity depression could be overcome earlier during the preliminary cycling by subjecting the newly formed battery to several successive deep cycles of charge and discharge; with the cells described, the deep cycling comprised discharging at constant current at the six-hour discharge rate and charging at the 16-hour rate. Capacity recovery occurred in about 8–10 deep cycles.

It was discovered that the long-term capacity is higher where the phosphoric acid is added after formation as compared to where the phosphoric acid is added before formation; therefore for higher long-term capacity it is advantageous to develop maximum capacity before adding phosphoric acid to the electrolyte. No advantage was found in adding the optimum phosphoric acid concentration in periodic fractional amounts.

Addition of phosphoric acid to the paste mix resulted in better performance relative to that obtained where no phosphoric acid was added to the paste mix and the former demonstrated far less early-cycle capacity depression as compared to where the phosphoric acid is added to the electrolyte. It proved impractical to add as much phosphoric acid to the paste mix as the optimum amount added to the electrolyte because of the degree of stiffening of the wet paste mix. However, the smaller amount of paste stiffening accompanying the addition of comparatively minor amounts of phosphoric acid may be tolerated for the advantageous results.

Autoradiographic studies showed that the phosphoric acid additive resists deposition of lead sulfate in the paste of the positive plate close to the grid surface and on the grid surface, confining sulfation for the most part nearer to the exterior area of the paste. This appears to explain the increase in useful life. However, there is a reduction in capacity related to the reduction in the total amount of paste or active material made available for a particular discharge because of the impeded accessibility of interior plate regions to the sulfation process.

The use of phosphoric acid in lead-acid storage batteries results in retained firmness of positive active material and resistance to shedding. Where no phosphoric acid is used positive active material gradually softens until it becomes so soft as to lose coherence. Lead sulfate has greater specific volume than lead dioxide; pore size changes during cycling attributable to these differences in specific volumes contribute to crumbling and shedding of active material. It is postulated that the use of phosphoric acid results in formation of an active material matrix structure that incorporates phosphate. A compound containing lead and phosphate probably forms during charge; with the specific volume of such a compound being more than that of lead dioxide. The stresses in the active material containing phosphoric acid is thus lower than in active material having no phosphoric acid.

Figure 5:
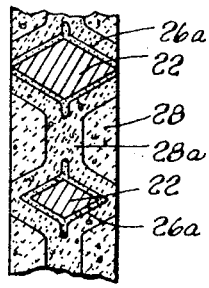
Figure 5A:
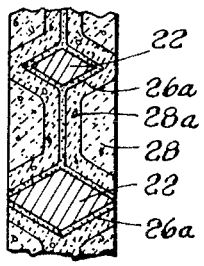

A modification of the invention is shown in FIG. 5 and FIG. 5a, wherein the pasted grid structure includes relatively high density inner layer 26a, a normal density outer layer 28 formed from a paste mix containing a minor amount, i.e., one to several percent of phosphoric acid, and an intermediate layer 28a of normal density and thicker than the inner and outer layers and formed from the same paste mix as the outer layer without the phosphoric acid. The high density thin inner layer inhibits formation of a sulfate barrier layer at the grid surface and the outer layer formed from paste mix containing phosphoric acid resists shedding far better than the intermediate layer at a small sacrifice in electrical characteristics.

The plural density active porous material aspects of this invention though particularly advantageous in lead-acid storage batteries, is also applicable to the positive plates, sintered or pasted, of alkaline electrolyte batteries, e.g., nickel-cadmium batteries, silver-zinc batteries, and silver-cadmium batteries. Plural density layers in sintered plates is achieved by selecting silver or nickel powders of different particle sizes for the different densities or by sintering powders of the same particle size at different temperatures over different time periods or a combination of both. Reduction in particle size results in increased density. To sinter the inner layer for a longer period than the outer layer, the inner layer is sintered before the next layer is applied. Then the combination is sintered.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:
1. A lead-acid storage battery comprising
a plurality of alternately positive and negative plates;
sulfuric acid electrolyte immersing said plates;
each of said positive plates including:
 a lead-calcium alloy conductor grid containing approximately 0.05% by weight of calcium, and
 three layers of porous active material embedding and supported by said grid and including an inner layer in contact with and enclosing said grid, an intermediate layer over the inner layer and thicker than the inner layer and less dense than the inner layer, and an outer layer over the intermediate layer exposed to the electrolyte and of essentially the same density as the intermediate layer and thicker than the inner layer.
2. A lead-acid storage battery comprising
a plurality of alternately positive and negative plates,
sulfuric acid electrolyte immersing said plates,
each of said positive plates including
 a lead-calcium alloy grid containing approximately 0.05% by weight of calcium, and
 porous active-material embedding and supported by said grid and having an inner layer in contact with and enclosing said grid and an outer layer surrounding the inner layer and thicker and less dense than the inner layer, and
 a minor percentage of phosphoric acid contained within said electrolyte in a relationship of approximately 0.4 milliliter of 85% concentration phosphoric acid for each 45 milliliters of approximately 1.260 specific gravity sulfuric acid at 25° C.

References Cited

UNITED STATES PATENTS

| | | | |
|---|---|---|---|
| 2,202,489 | 5/1940 | Hauel | 136—26 |
| 2,662,928 | 12/1953 | Brennan | 136—24 |
| 3,053,925 | 9/1962 | Donohue | 136—70 |
| 3,172,782 | 3/1965 | Jache | 136—6 |

A. B. CURTIS, *Primary Examiner.*

A. SKAPARS, *Assistant Examiner.*

U.S. Cl. X.R.

136—65, 154